July 29, 1958  L. D. COBB  2,845,285
DEMOUNTABLE CLOSURE
Filed June 3, 1955
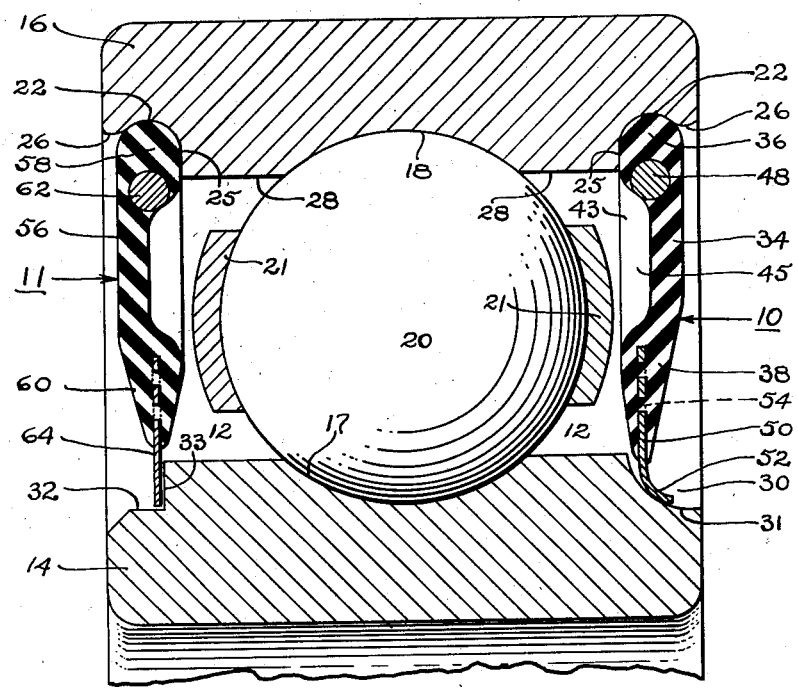
Fig. 1
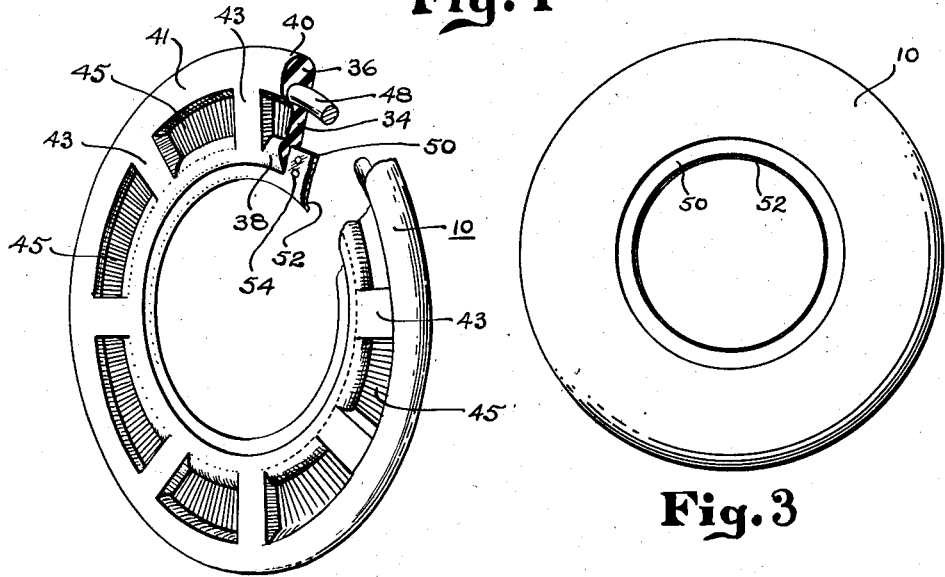
Fig. 2
Fig. 3
INVENTOR.
LELAND D. COBB
BY Edward K. Goodrich
HIS ATTORNEY United States Patent Office 2,845,285
Patented July 29, 1958

2,845,285

DEMOUNTABLE CLOSURE

Leland D. Cobb, Forestville, Conn., assignor to General Motors Corporation, Detroit, Mich., a corporation of Delaware Application June 3, 1955, Serial No. 512,946

5 Claims. (Cl. 286—11)

This invention relates to a demountable closure for closing an end of the annular space between a pair of relatively rotatable members and particularly to a closure or seal which may be demountably secured in the end of an antifriction bearing for retaining lubricant in the bearing and for preventing the entrance of dirt and undesirable materials into the bearing.

The efficient operating life of antifriction bearings, such as ball bearings, is principally dependent upon the retaining of a small predetermined volume of suitable lubricant within the bearing and also providing a bearing construction which prevents the ingress of dirt and other deleterious materials into the bearing. It has been common practice to close the end of an antifriction bearing with a permanently installed seal embodying a metal member folded over at its periphery into tightly wedged sealing engagement within a groove in one of the race rings of such a bearing. These sealed bearings are occasionally subjected to heavy overloads and/or to excessive operating temperatures. Also, the seals for such bearings occasionally become damaged causing lubricant leakage from the bearing. An overloaded or insufficiently lubricated antifriction bearing quickly overheats causing the bearing lubricant to oxidize and lose its lubricating properties thus further reducing lubrication of the bearing and greatly shortening the bearing life. It is not practical to remove a permanently installed metal seal from such a bearing to permit occasional cleaning and lubrication of the bearing. In fact, such a seal removal usually necessitates the removal of the bearing from the machine in which it operates and shipping the bearing back to the manufacturer for removal of the seal and reinstallation of another seal. In the removal of such a permanently installed seal, the seal is ruined and frequently the bearing is injured sufficiently to necessitate bearing replacement. Consequently, bearings with permanently installed seals are usually operated without attention until they fail at which time the machine has to be taken down and the bearing replaced resulting in much loss of production time while the machine is dismantled.

It is, therefore, an object of this invention to provide an improved annular closure of simple construction and which may be easily removed and replaced into closing relation across an annular lubricant chamber between relatively rotatable members to permit cleaning and relubrication of the parts within the lubricant chamber without injury to the closure or the relatively rotatable members.

A further object is to provide for the end of an annular lubricant chamber of an antifriction bearing an improved resiliently deformable closure member having simple and efficient construction and which may be repeatedly and easily removed from and reinserted in the end of the bearing without damage to the closure or to the bearing thus facilitating cleaning and relubrication of the bearing.

To these ends and also to improve generally upon devices of this character, this invention consists in the various matters hereinafter described and claimed. In its broader aspects, the invention is not necessarily limited to the specific structures selected for illustrative purposes in the accompanying drawings wherein—

Figure 1 is a fragmentary cross section view of a ball bearing illustrating two related forms of my demountable closure.

Figure 2 is a broken-away perspective view showing the closure at the right hand end of Figure 1.

Figure 3 is an end view of the closure member.

My demountable closure in the general form of a sealing washer as 10, is inherently resilient and so constructed that it may be repeatedly mounted into and demounted from closing position across the end of an annular lubricant chamber 12 between relatively rotatable members herein illustrated as antifriction inner and outer race rings 14 and 16, these rings being provided with raceways 17 and 18 that receive rolling elements such as balls 20 guided by a suitable separator or cage 21. Each end of one of the race rings, such as the outer race ring 16, is provided with an annular seal-receiving groove 22 that is transversely curved between a generally radially disposed annular shoulder 25 and a transversely rounded annular land 26 which has a diameter intermediate between that of the bottom of the groove 22 and that of an inner cylindrical wall 28 of the race ring 16. The other race ring, as the inner race ring 14, is provided with a suitable annularly extending seal receiving notch as 30, and within which a flexible lip of the sealing member is received. The annular notch shown at the right hand end of the inner race ring is preferably provided with a transversely curved wall 31 against which a lip of the seal may lightly slide in wiping engagement. The notch at the left hand end of the inner race ring is preferably provided with a generally cylindrical wall 32 terminating in a substantially radial wall 33 which may lie in closely spaced relation to a sealing lip.

My closure member or sealing washer 10 may be composed of various inherently resilient elastomeric materials that may be suitably molded under the influence of heat and pressure to provide the required shape and needed yieldable characteristics and which will not deteriorate or change characteristics of resiliency in the presence of heat, light, and bearing lubricants. One such elastomeric material for my closure member 10 comprises an inherently resilient synthetic rubber embodying a polymerization product of butadiene and acrylic nitrile.

My demountable sealing washer 10 has a substantially radial disposed annular wall 34 merging at its outer peripheral portion with an annular bead 36 and radially inwardly merging with a tapering annular portion 38. The bead 36 is of greater thickness than that of the wall 34 and has a transversely rounded peripheral face 40 merging with the flat outer side face of the wall 34. The bead face 40 also merges with a substantially radially disposed flat inner bead face 41 which is coextensive with the flat side faces of a plurality of circumferentially spaced generally radially disposed ribs 43 merging with the tapering annular portion 38 and projecting laterally outwardly from the wall 34. These ribs 43 which are integral with other portions of the sealing washer 10 yieldably reinforce the sealing washer and provide the circumferentially spaced pockets 45 which add to the lubricant capacity of the bearing.

The transversely rounded face 40 of the bead is preferably slightly larger in diameter and in width than that of the groove 22. The bead is also provided with an embedded reinforcement of suitable rigid material such as a metal ring 48 which may be a continuous ring or may be bent up to circular form with its ends in close proximity. With this arrangement, the bead 36 may be easily and deformably snapped past the annular land 26 and into firmly seated sealing relation against the walls of the groove 22 and against the shoulder 25. Due to the inherent yieldability of this bead, it will be resiliently and firmly maintained in desired position without producing the objectionable distorting forces which have been present in some prior types of seals wherein metal members were bent into expanding relation against the walls of a groove. Furthermore, with this construction the elastomeric material of the bead will be resiliently compressed between this ring 48 and the walls of the groove 22 and shoulder 25 and the seal need not be made of a stiffness which would be insufficient for the freedom of resilient yieldability to maintain a proper sealing relation in the event that the race rings 14 and 16 are not precisely coaxial with each other.

The tapering annular portion 38 has partially embedded therein and bonded thereto an annular sealing ring 50 which projects radially inwardly from the thin inner edge of this annular portion 38 to yieldably and resiliently engage in lightly wiping contact with the transversely curved annular wall 31 of the notch 30. This sealing ring 50 may be stamped out of thin resilient sheet material such as a suitable spring metal and is preferably provided at its inner end with a laterally outwardly curved lip 52 to provide a rounded surface in lightly wiping engagement with the inner race ring surface 31. Also, to aid in securing the resilient ring 50 in position, it may be provided with a series of spaced holes 54 through which the molded elastomeric material will flow during the molding operation.

With this construction, the resiliently yieldable character of the elastomeric sealing washer assures that the laterally curved portion of the thin resilient sealing ring 50 is yieldably maintained in uniformly light sealing engagement with the curved face 31 of the annular notch 30. The radially disposed reinforcing ribs 43 of elastomeric material will prevent too great a lateral flexibility of the sealing washer and will not detrimentally impair the resiliency of the sealing washer. Additionally, the freely flexible springy character of the thin sealing ring 50 further assures an effective seal even in the event that the surface 31 is not coaxial with the outer race ring 16. Hence, an effective seal is maintained to keep lubricant within the bearing and to exclude dirt and objectionable materials from entering the bearing. The presence of bearing lubricant will provide a substantially antifrictional seal engagement and substantially eliminate wear of the sealing ring 50 and the annular notch face 31.

In the embodiment shown at the left hand of Figure 1, I have provided a demountable annular closure in the form of a resilient sealing washer 11 generally similar in character to the closure 10 and having a lateral side wall 56, bead 58, and tapering annular portion 60 generally corresponding to the form of the sealing member 10. The rubber-like compressibly resilient bead 58 which is demountably seated in the outer race ring groove 22 and against the annular shoulder 25, is reinforced by a wire ring 62 generally corresponding to the reinforcing ring 48. A resiliently flexible thin sheet metal sealing ring 64 is embedded within and radially projects from the annular portion 60 in a generally similar manner to that of the sealing ring 50. However, the thin resilient metal ring 64 preferably is maintained flat and radially extends into the notch formed by the walls 32 and 33, the flat inner face of the spring ring 64 preferably extending into closely spaced proximity to the flat annular wall 33 to prevent lubricant leakage from the chamber 12 and to prevent ingress of dirt into the bearing. However, if desired, the inner face of this spring ring 64 may be in light wiping engagement with the annular shoulder 33.

I claim:

1. In a closure for demountable positioning across an annular lubricant chamber between a pair of relatively rotatable members one of which has an annular surface facing towards the other member, an inherently resilient elastomeric closure washer demountably seated in sealing engagement against said annular surface and extending generally radially across the lubricant chamber into spaced relation with said other relatively rotatable member, a substantially radially disposed annular side wall on said other relatively rotatable member, a flexible thin annular metal member gripped by the resilient closure washer, said annular metal member having an imperforate annular lip radially extending from the closure washer into laterally spaced parallel proximity with said annular side wall.

2. In a closure for demountable positioning across an annular lubricant chamber between a pair of relatively rotatable members one of which has an annular surface facing towards said other member, said other member having an annular notch provided with a side face, an inherently resilient closure washer demountably and deformably seated in sealing engagement against said annular surface and extending generally radially into spaced relation with said other member, circumferentially spaced flexible ribs laterally stiffening the closure washer and a flexible thin resilient sealing ring embedded in the closure washer and extending from the closure washer into lightly wiping sealing engagement with said side face on said other relatively rotatable member.

3. In a closure for demountable positioning across an annular lubricant chamber between a pair of relatively rotatable members one of which has an annular groove opening towards the other member, said other member having an annular seal-engaging surface, a deformably resilient washer of elastomeric material, a peripherally disposed bead on the washer deformably and resiliently seated in sealing engagement with the walls of said groove, the washer extending across the lubricant chamber into spaced relation with said other member, circumferentially spaced resilient ribs integral with the washer and laterally stiffening the yieldability of the washer and providing lubricant pockets therebetween, a thin resilient metal sealing ring bonded to the washer and radially extending therefrom, and a sealing lip on the sealing ring in lightly resilient wiping engagement with said seal-engaging surface.

4. In a closure for demountably positioning across an annular lubricant chamber between a pair of relatively rotatable members one of which has an annular groove opening towards the other member, said other member having an annular seal-receiving notch provided with an annular seal-engaging surface, a deformably resilient elastomeric washer having a peripheral bead demountably and sealingly seating against the walls of the groove, a reinforcing ring embedded in the peripheral portion of the washer to urge the bead into seated relation, the washer extending across the lubricant chamber into spaced relation with said other member, circumferentially spaced generally radially disposed resilient ribs formed integrally with the washer to laterally stiffen the washer and provide lubricant pockets therein, a thin resilient metal sealing ring bonded within and to the washer and radially projecting therefrom, and a laterally curved sealing lip on the sealing ring in lightly wiping sealing engagement with said annular seal-engaging surface.

5. In a closure for demountable positioning across an annular lubricant chamber between a pair of relatively rotatable members one of which has an annular groove opening towards the other member, said other member having an annular seal-receiving notch provided with a transversely curved seal-engaging surface, an elastomeric resilient sealing washer, a peripheral bead on the washer deformably and resiliently seated in sealing engagement with the walls of said groove, the washer extending across the lubricant chamber into spaced relation with the seal-receiving notch, an intermediate annular portion of the washer being thinner than the rest of said washer, circumferentially spaced generally radially disposed ribs integral with the washer and providing lubricant retaining pockets, a wire reinforcing ring embedded in the bead, a flexibly resilient sheet metal sealing ring embedded in the washer and projecting therefrom, and a laterally curved sealing lip on the sealing ring in yieldable side wiping engagement with said seal-engaging surface.

References Cited in the file of this patent

UNITED STATES PATENTS

| | | |
|---|---|---|
| Re. 21,584 | Brodin | Oct. 1, 1940 |
| 1,977,081 | Olsen | Oct. 16, 1934 |
| 2,237,616 | Smith | Apr. 8, 1941 |
| 2,467,049 | Peterson | Apr. 12, 1949 |
| 2,688,502 | Cobb | Sept. 7, 1954 |
| 2,720,404 | Saywell | Oct. 11, 1955 |

FOREIGN PATENTS

| | | |
|---|---|---|
| 495,066 | Canada | Aug. 4, 1953 |